No. 840,559. PATENTED JAN. 8, 1907.
C. ELLIS.
PROCESS OF FIRING PORCELAIN.
APPLICATION FILED JAN. 4, 1906.
FIG 1.
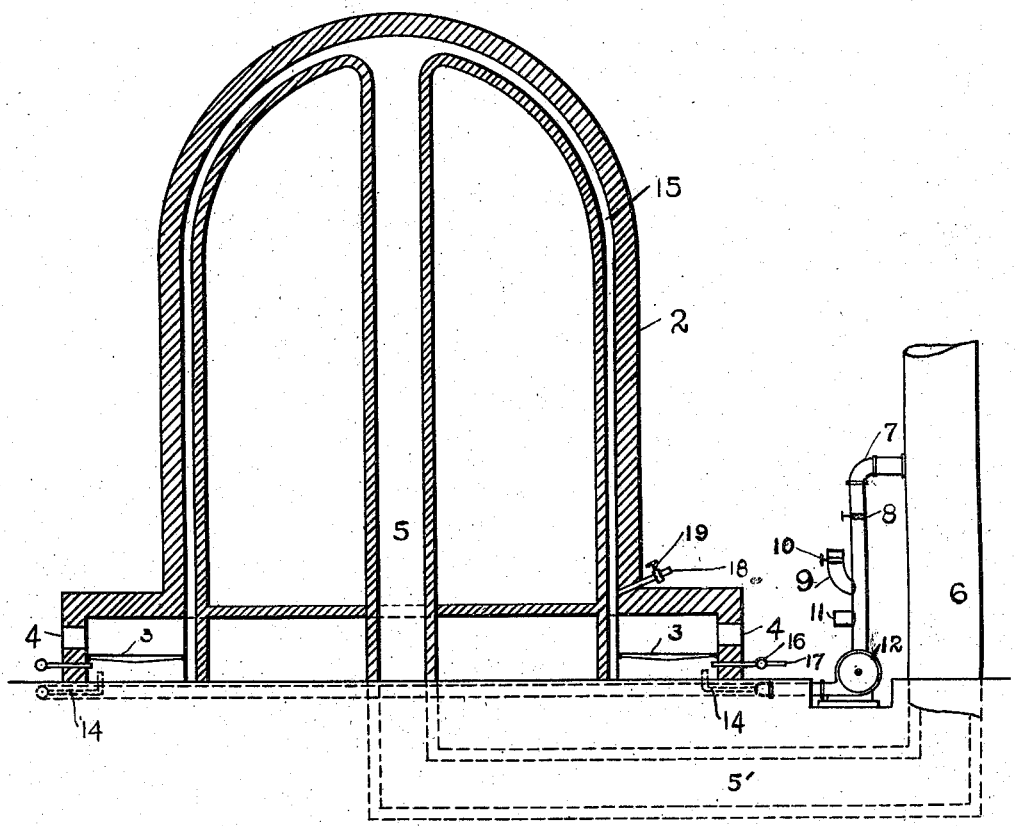
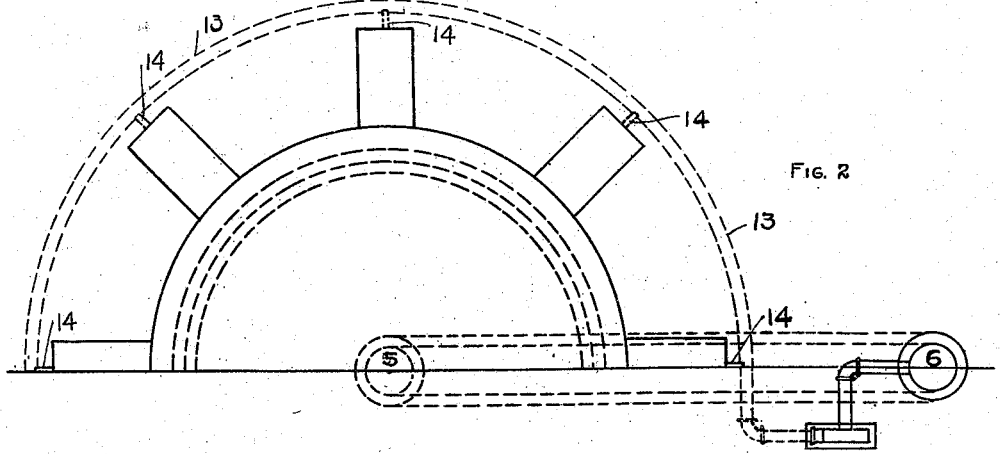
Fig. 2
Witnesses
Inventor
Carleton Ellis
By his Attorneys Marble & McElroy

UNITED STATES PATENT OFFICE.

CARLETON ELLIS, OF WHITE PLAINS, NEW YORK.

PROCESS OF FIRING PORCELAIN.

No. 840,559.        Specification of Letters Patent.        Patented Jan. 8, 1907.

Application filed January 4, 1906. Serial No. 294,513.

*To all whom it may concern:*

Be it known that I, CARLETON ELLIS, a citizen of the United States, residing in White Plains, county of Westchester, and State of New York, have invented certain new and useful Improvements in Processes of Firing Porcelain; and I hereby declare the following to be a full, clear, and exact description of the invention, such as will enable others skilled in the art to which it appertains to practice and use the same.

This invention relates to a process of firing porcelain and similar ware; and it consists in a method of heating porcelain, terra-cotta, glass, and fire-set plastics generally, in the manufacture and in the decoration thereof, by means of ignited atmospheres of certain peculiar characteristics, all as more fully hereinafter set forth, matters of novelty being particularly pointed out in the appended claims.

Porcelain ware, terra-cotta, and ware of the many modern fire-set plastic compositions which range between the true porcelains—*i. e.*, kaolin mixtures and vitrifiable mixtures more of the nature of glass—are customarily fired in muffles or saggars, partly with the idea of avoiding direct contact, in so far as may be, with fire-gases, and partly to avoid injury from ash particles, soot, &c. Subsequent firing of such articles to affix glazes or decorations, as in china-painting, is also done in the same way. The complete exclusion of fire-gases, however, is not practicable, since at the high temperatures employed all materials are more or less permeable by gases, even if they be non-porous, while as a matter of fact the refractory clays and compositions used for muffles and saggars are always porous and fissured and afford ready passage-ways for gases, which under the ordinary laws of diffusion constantly tend to average the composition of the atmospheres within and without the muffle or saggar.

In modern practice, moreover, where porcelain, stoneware, and terra-cotta are made on the large scale, in order to permit cheap manufacture of muffles of the necessary size, it is the custom to make them sectional—to build them up of segments. In firing, these segments naturally expand and contract, producing fissures or openings. These crevices, together with the natural porosity of the materials from which the muffle is made, permit a ready interchange of the gases within and without the muffle. The smaller saggars, in which valuable porcelain, &c., articles are fired, while not so apt to crack or fissure, are nevertheless quite as permeable to gases, because the necessary closures never fit accurately. With the usual methods of firing, this gas permeability of the muffles and saggars is a source of grave inconvenience and loss. With gases of a reducing nature, such as those often obtained in the flames from ordinary fires or from ordinary gas, there is always danger of free carbon gaining access to or being formed within the muffle or saggar, in the latter case through the decomposition of hydrocarbons or by the reaction of free hydrogen on carbon oxids, both these reactions being very much facilitated by the fact that, the material being heated, the clay, or the iron oxids therein contained act as a catalytic body at high temperatures, tending to produce these reactions within its pores. Sooty flames may, and often do, gain direct access through crevices. Free carbon in or on the ware is, however, very detrimental, either producing soot spots or darkening the ware, the latter particularly when the reactions take place in the body of the ware, and it is usually very difficult to burn carbon out of the ware, especially since the flow of the glaze tends to inclose and protect it from air. Further, since many of the metallic oxids and salts used in china-painting are readily reducible and since reducible compounds, like lead oxid, are often contained in glazing compositions it frequently happens that a reducing atmosphere is also detrimental, because of its direct effect on the ware. In other cases of course a reducing atmosphere is sometimes desirable, as in making the copper-reds in decorating china and glass. Free carbon, however, is always detrimental. It is obvious that ability to control the atmosphere in the muffle is highly desirable.

Many attempts have been made in the prior history of the art to obviate the stated inconveniences due to the ordinary methods of firing; but these have generally taken the form of an effort to exclude fire-gases from the interior of muffles or saggars. This is, however, wholly impossible practically, and moreover, the more impermeable the muffle or saggar has been made the slower has proved the transmission of heat through its walls. Transmission of heat is always slow through materials of the nature of those which must be used for muffles and saggars.

and very slight thickening of their walls, as in efforts to make them impermeable, retards such transmission very much. Further, the heating in the muffle really depends in a measure on interchange of gases through the walls. Again, evenness of heat is a prime necessity in firing ceramic wares of all kinds, but particularly with such fire-set plastics as are now used in modern "art potteries." Frequently with these latter compositions there is a comparatively narrow range of degrees between the point where the ware is baked, fritted, or vitrified and that at which it fuses down wholly or partially. The same is true in making stoneware and in glazing and decorating all kinds of ceramics. Obviously it is desirable that about the same degree of heat shall obtain in all parts of the muffle or saggar containing a piece of such ware, since otherwise one portion may be melted and another not completely baked or fired, and also it is desirable that such heat shall be susceptible of accurate and close regulation. Such evenness and regulation of heat in a muffle is, however, excessively hard to attain in practice by prior methods, particularly if an attempt be also made to keep the heating-flame free from soot. A muffle of a size large enough to contain many pieces of ceramic ware is too large to be heated uniformly save by a flaming fire, by the burning of gases containing enough free carbon to permit the expansion of flame around the entire surface of the muffle, and the development of heat at all points by radiation from the suspended carbon. This is, however, a sooting-flame and dangerous to the contents of the muffle for reasons stated, and, moreover, even with the best regulable of such flames—as that from an oil-burner, for instance—direct observation will show the difficulty of getting the same development of heat at all points, so that the floor of the muffle shall be neither hotter nor cooler than the walls or the roof. Such a flame is usually more or less stratified; but the danger of such a sooty flame, though it permits of evener heating than any other prior method of firing, has led to its disuse except for the coarsest articles. In practice it is usually sought to have complete combustion of the flame heating the muffle without the development of free carbon or a reducing atmosphere; but no ordinary flame is of sufficient volume to completely bathe a large muffle, and, furthermore, the zoned character of such a flame necessarily leads to differential development of heat at different points where it impinges.

Ordinary fuels are, so to speak, too concentrated. They give a relatively short hot flame, and for heating objects of large volume, such as a muffle, reliance must necessarily be placed on the sensible heat of the products of combustion; but sensible heat is given up to the first cooler objects encountered, and the result is that in such a manner of heating in a given space, as the flame-chamber surrounding a muffle, temperatures rapidly decrease from the hottest point in such a short flame or the "oxidizing zone" thereof and the surfaces immediately adjacent thereto to points more remote. Unevenness of heating in the space is of course the result. With such a large object to be heated as a porcelain muffle this unevenness is very apparent, some one wall being always much hotter than the others. This is very detrimental to ware in such a muffle, causing glazes to flow and flux unevenly, causing unevenness in baking, &c. It is also detrimental to the muffle itself, causing it to crack and be short-lived. The defects mentioned are inevitable and inherent in all the fuels heretofore tried used for heating porcelain muffles. They all give rise to too much heat in one portion of the flame-chamber containing the muffle and to too little in others, and they give no sufficient control over the character of the atmosphere in the muffle itself. Therefore manufacturers of porcelain and similar ceramic wares and producers of decorated china and glass have been forced to accept the production of a large percentage of waste and culls as unavoidable, and such articles are necessarily relatively high-priced for this reason.

It is the object of this invention to obviate these inconveniences and losses by a simple, cheap, and practicable method. Instead of striving to prevent the entry of fire-gases into muffles and saggars these gases are simply made of such nature that their entry can do no harm, or will be advantageous, thereby enabling the use of thinner more readily conducting walls in muffles and saggars, with the result of longer life and cheaper operation, as well as cheaper construction. Simultaneously such gases are made of a nature permitting as tardy a burning as may be desired, thereby enabling the production of a flame which may at pleasure be caused to have any desired volume or temperature and be caused to envelop a muffle or saggar completely, burning uniformly and developing heat uniformly at all points. In this method no reliance need be placed on the conveyance of heat, as sensible heat in the products of combustion. It is developed at the point where it is required. The advantage of these results is obvious. The largest muffle may be kept uniform in temperature on all sides, so that contained porcelain or other ceramic articles are evenly heated, glazes and colors uniformly fused and united to the base, and all danger of local underheating or overheating avoided, and since, as stated, the flame atmosphere can be made of any character desired, from reducing to strongly oxidizing, and of homogeneous character throughout without the irregularities resulting from the presence of free carbon there is no particular object in endeavoring to restrain its contacting with the articles to be fired by permeating the muffle-walls. Such entry is even to be desired in many cases as facilitating heating and influencing the production of special results in glazing and coloring. In such cases it is generally an oxidizing character which is desired, as in the use of lead and other oxids and metallic salts in glazes and paints; but in some cases, as in the production of avanturin finishes, it is desirable to have it reducing. Either character can be produced with equal facility.

Briefly stated, my process consists in admixing with the gases, to furnish the flame atmosphere around the muffle, regulated amounts of diluent gases. Where oxidizing atmospheres are desired, this diluent may be air in excess of the amount required for combustion; but generally I prefer to use products of combustion, because of the specific retarding influence of the carbon dioxid therein contained. Thereby I secure a tardily-burning mixture which gives an inflated flame of any desired volume and which, while yielding no less total heat than the combustible component alone, yields it over a greater area and in a longer time. In this manner I can develop an even generation of heat over the entire surface of the muffle. The retardation is partly due to the dilution, partly due to the slowing action of the carbon dioxid of the products of combustion which retards the formation of more carbon dioxid in accordance with the ordinary laws of mass action. The net result is a flame which may be made of any volume, of any temperature, and of any speed of burning and which may be adjusted in any one of these respects by a simple adjustment of the proportions of its component gases. Such a flame or flame atmosphere will envelop the muffle or saggar to be heated, burning evenly and homogeneously at all points and developing its heat at the point where it is wanted instead of somewhere else. Thereby I attain the result long sought in this art of an even muffle-heating. In order to assure the greatest possible uniformity, however, I preferably, though not necessarily, make the gas mixture so dilute and tardily-burning as to require the heat of the heat zone of the flame-chamber, formed by the muffle and the encompassing-chamber walls of the furnace, to complete its combustion. Such a mixture may be readily made. In a properly-designed flame-chamber this will insure an equal combustion throughout, and consequently an equal development of heat at all points.

In the gas mixture used, whether it is to furnish a flame atmosphere of oxidizing or reducing nature, I proportion the components so that no free carbon shall be developed. By this means permeation of the atmosphere into the muffle does no damage. In going through the glowing walls of the muffle whatever combustion can be effected in the gas mixture is effected, and the penetrating atmosphere is in, so to speak, a resting condition. Preferably I use a gas free from unoxidized carbon, such as producer-gas, and this is advantageously also free from hydrogen or steam. It is difficult to operate a producer making water-gas without allowing more or less steam to pass through the fuel unchanged to contaminate the gas, and some steam is inevitably found in the gas whatever precautions may be taken. Steam in the gas, present from whatever cause, and the steam formed in burning hydrogen act detrimentally, since the violent reversible reactions with carbon oxids occurring whenever temperatures change derange the normal development of the flame, "deadening" it, and some of such reactions may occur in the muffle, even producing free carbon therein, with resultant sooting of the ware. I therefore prefer to operate a gas-producer with products of combustion as an endothermic or cooling agent, thereby producing a gas substantially dry or free from hydrogen or steam. Water-gas may, however, be used; but its employment necessitates more care and attention on the part of the operator. I may also, where convenient, use such rich gases as natural gas; but in such cases I prefer to take special precautions. With natural gas, in order to obviate the possibility of the formation of free carbon or any local reducing action, the diluting-gas is usefully composed of a large excess of air over that necessary for complete combustion, admixed, as usual, with more or less products of combustion. A mixture of natural gas with a large excess of air over that necessary for complete combustion can be made to burn at any rate desired, and the flame is naturally strongly oxidizing. With very large excesses such a mixture will only burn in a heated chamber such as described.

The gas may be taken from the producer or other source and admixed directly with the necessary diluents and air and the mixture sent into the flame-chamber, or the desired mixture may also, and very simply, be, so to speak, formed in place by burning fuel on a grate with a forced draft of air and products of combustion delivered through it at such a rate that more or less of both go through unchanged and mix with the carbon monoxid formed from the fuel. The carbon dioxid in the draft-current prevents the formation of carbon dioxid on the grate, and the fire therefore runs cool and furnishes a maximum of carbon monoxid. In either method of making the mixture it is obvious that a simple change of a valve or two, regulating the feed of one component or the other, is sufficient to adjust the composition of the flame atmosphere in the flame-chamber, making its combustion slow or as rapid as may be desired and causing the atmosphere within or without the muffle to be that best adapted to the particular end sought.

With the regulable non-sooting-flame atmospheres described the main function of the muffle or saggar is to serve as a shield to protect the ware from mechanical contamination by flying dust, ashes, and cinders instead of being, as heretofore, also designed as a shield against flame-gases. It is in a measure a dust-filter; but it serves another purpose also, that of forming, together with the inclosing walls of the furnace, a refractory-walled flame-chamber in which an even combustion can be assured by radiant heat. Further, the muffle serves likewise to insure a completion of reaction in the gas mass going through its pores. Each of such pores acts like the hot-walled zone formed by muffle and furnace walls to complete the combustion of the slow-burning gas mixture, but, because of its small diameter and the fact that the said gases come into actual contact with the catalytically-acting clay particles of the pore, the action of the pore is much more rapid.

With very dilute flame-atmospheres it is desirable to use hot air as a component of the mixture or as a burning agent, and this may be usefully obtained by regenerators or other devices abstracting heat from the waste gases leaving the flame-chamber.

In the accompanying illustration I have shown more or less diagrammatically one type of apparatus suitable for carrying out my process selected from the wide variety of structures which may be used.

Figure 1 is a central vertical section, partly in elevation, showing a plurality of muffles and heating devices; and Fig. 2 is a partial horizontal section.

Like reference characters designate like parts in both views.

Characters 1 1' designate a porcelain muffle inclosed by a hooding-furnace 2, with the comparatively narrow flame passage or chamber 15 therebetween and provided with a plurality of grates 3, with fuel-feeding doors 4.

5 is a downtake-chamber in the center, continued as flue 5' to chimney-stack 6. From the stack pipe 7, provided with valve 8, abstracts a controllable amount of products of combustion. Pipe 9 and valve 10 supply a controlled amount of air for admixture therewith under the suction of fan 12. The admixed gases are delivered to a ring-pipe 13, whence they find their way under the several grates 3 by means of twyers 14. By setting valves 8 and 10 the proportions of air and products of combustion can be readily controlled, and by differential speeding of the fan the amount of the mixture going through the grate can be changed as desired. This arrangement enables the formation of the desired flame atmospheres from solid fuel in a convenient manner. Ordinarily in this method of working the fuel will be maintained in a shallow bed; but if so desired the grate 3 may be run as a straight gas-producer by supplying a bed of fuel thereto deep enough to insure complete reaction with the draft-current sent through. In such cases the air necessary for combustion and the products of combustion for dilution may be admixed at the bottom of flame-flue 15 by means of pipe 18, provided with valve 19.

When gaseous fuel is to be used, no fuel is placed on the grate, and gas more or less diluted is supplied through pipe 17, which is provided with valve 16, adjacent to the opening of the twyer 14, or the mixture may be prepared by introducing into pipe 7 on the suction side of fan 12 a supply of gas through pipe 11. With the highly-diluted gas mixtures used in the present process flame will not propagate back of the heated zone of flue 15. In this flue, owing to its comparatively small cross-section, the gases are very thoroughly mixed by eddy-currents and a uniform tardy burning flame fills the whole flue.

Combustion is inaugurated in the flue 15 and continued and completed in downtake 5, combustion being substantially uniform throughout. Inasmuch as in the structure shown there is a slight fan-pressure in the narrow flue 15 and chimney-draft in downtake 5, there will be more or less drift of gases through the porous walls of the muffle, this taking place to the largest extent at the bottom of the muffle, where the difference in pressure is the greatest; but no burning will take place in the muffle itself, the reaction of the gases on each other being completed in the passage through the glowing wall. This tends to keep the point in the muffle opposite the gas-entrance as warm as the rest, and the entry of hot gases at the foot of the muffle tends materially toward equalizing temperatures in the muffle itself. Naturally if in the gas mixture used there is an excess of oxygen over that required by the combustible the inward-drifting gases are oxidizing. If the combustible is in excess, they are reducing. Where, as is preferred, a dry combustible gas, free of water, hydrogen, and unoxidized carbon is used, there need be no fear of sooting.

What I claim is—

1. The process of firing ceramic ware which consists in placing such ware within a suitable inclosing chamber and applying heat by circulating around such chamber a body of burning gases free from unoxidized carbon, the combustion in such gas body occurring in substantially the entire portion of such body which is in the vicinity of such chamber.

2. The process of firing ceramic ware which consists in placing such ware within a suitable inclosing chamber and applying heat by circulating around such chamber a body of burning gases free from unoxidized carbon and comprising a mixture of combustible gas, oxygen, and combustion-retarding gas, the combustion in such gas body occurring in substantially the entire portion of such body which is in the vicinity of such chamber.

3. The process of firing ceramic ware which consists in placing such ware within a suitable inclosing chamber and applying heat by circulating around such chamber a body of burning gases free from unoxidized carbon and comprising a mixture of combustible gas, combustion-retarding gas, and an excess of oxygen, the combustion in such gas body occurring in substantially the entire portion of such body which is in the vicinity of such chamber.

4. The process of firing ceramic ware which consists in placing such ware within a suitable inclosing chamber surrounded by a combustion-space having heat-radiating walls, and circulating through such combustion-space a body of burning gases free from unoxidized carbon, combustion in such gas body occurring substantially throughout the portion of such body which is in the vicinity of such chamber.

5. The process of firing ceramic ware which consists in placing such ware within a suitable inclosing chamber surrounded by a combustion-space having heat-radiating walls, and circulating through such combustion-space a body of burning gases free from free carbon and comprising a mixture of combustible gas, oxygen, and combustion-retarding gas, combustion in such gas body occurring substantially throughout the portion of such body which is in the vicinity of such chamber.

6. The process of firing ceramic ware which consists in placing such ware within a space separated from a combustion-space by a porous heat-radiating wall, and circulating through such combustion-space a body of burning gases free from unoxidized carbon and comprising a mixture of combustible gas, oxygen, and combustion-retarding gas, combustion in such gas body occurring in substantially the entire portion of such body which is in said combustion-space in the vicinity of the ware being burned.

7. The process of firing ceramic ware which consists in placing such ware within a space separated from a combustion-space by a porous heat-radiating wall, and circulating through such combustion-space a body of burning gases free from unoxidized carbon, combustion in such gas body occurring in substantially the entire portion of such body which is in the vicinity of the ware being burned.

8. The process of firing ceramic ware which consists in placing such ware within a suitable inclosing chamber having a porous wall composed of refractory material, circulating past said wall a body of burning gases free from unoxidized carbon and producing a drift of such gases through such porous wall into said chamber, and by the catalytic action of the material of such wall completing the combustion of the gas passing therethrough prior to contact with the ware.

9. The process of firing ceramic ware which consists in placing such ware within a suitable inclosing chamber having a porous wall composed of refractory material, circulating past such wall a body of burning gases free from unoxidized carbon and comprising a mixture of combustible gas, oxygen, and combustion-retarding gas and producing a drift of such gases through such porous wall into said chamber, and by the catalytic action of the material of such wall completing the combustion of the gas passing therethrough prior to contact with the ware.

10. The process of firing ceramic ware which consists in passing such ware within a suitable inclosing chamber having a porous wall composed of refractory material, circulating past such wall a body of burning gases free from unoxidized carbon and comprising a mixture of combustible gas, combustion-retarding gas, and an excess of oxygen and producing a drift of such gases through such porous wall into said chamber, and by the catalytic action of the material of such wall completing the combustion of the gas passing therethrough prior to contact with the ware.

11. The process of firing ceramic ware which consists in placing such ware within a suitable inclosing chamber surrounded by a combustion-chamber and separated therefrom by a refractory wall, said combustion-chamber having refractory heat radiating walls, circulating through such combustion-chamber a body of burning gases free from unoxidized carbon and comprising a mixture of combustible and combustion-supporting gases too poor in combustible to burn except under the influence of heat radiated from the walls of said chamber, and by the action of such radiated heat burning said gases, the combustion in such gas body occurring in substantially the entire portion of such body which is in the vicinity of said first-mentioned chamber.

12. The process of firing ceramic ware which consists in placing such ware within a suitable inclosing chamber, passing through a porous body of refractory material a body of gas comprising a mixture of combustible and combustion-supporting gases free from unoxidized carbon and too poor to burn except under the influence of heat radiated from surrounding objects, by the heat of the said body of refractory material completely burning the combustible constituent of such gas body, and causing the products of combustion to pass over the ware to be burned.

13. The process of firing ceramic ware which consists in placing such ware within an inclosing chamber surrounded by a combustion-space and circulating through such space a body of burning gases free from unoxidized carbon and maintaining around such chamber a zone of approximately uniform temperature by maintaining approximately uniform combustion of such gases in all portions of such combustion-space in the immediate vicinity of such chamber.

14. The process of firing ceramic ware which consists in placing such ware within an inclosing chamber surrounded by a combustion-space and circulating through such space a body of burning gases free from unoxidized carbon and comprising a mixture of combustible gas, oxygen, and combustion-retarding gas, and maintaining around such chamber a zone of approximately uniform temperature by regulating the proportion of combustion-retarding gas in the mixture so as to produce approximately uniform combustion of such gases in all portions of such combustion-space in the immediate vicinity of such chamber.

In testimony whereof I affix my signature in the presence of two witnesses.

CARLETON ELLI

Witnesses:
FLETCHER P. SCOFIELD,
T. H. FAIR.